Figure 1:
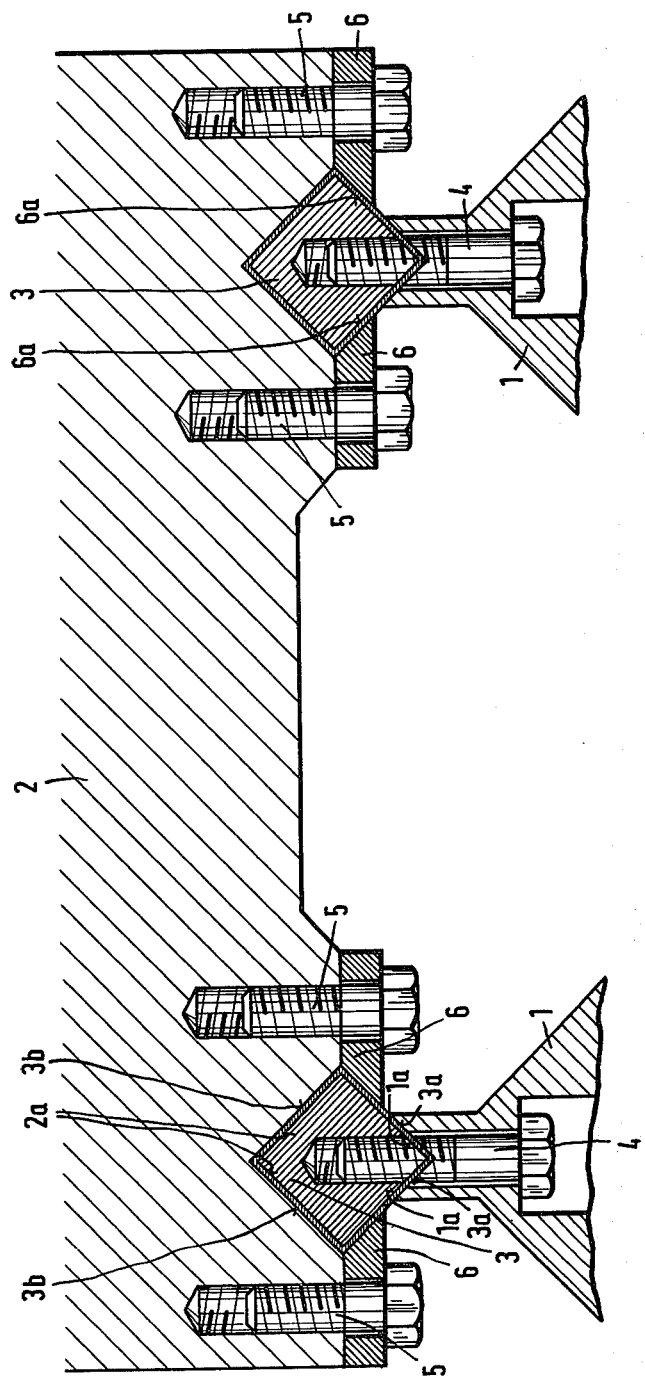

United States Patent [19]
Kotte

[11] 4,306,472
[45] Dec. 22, 1981

[54] MACHINE TOOL

[76] Inventor: Eberhard B. Kotte, Holbeinstrasse 29, 5650 Solingen 19, Fed. Rep. of Germany

[21] Appl. No.: 135,758

[22] Filed: Mar. 31, 1980

[30] Foreign Application Priority Data

Apr. 9, 1979 [DE] Fed. Rep. of Germany ....... 2914284

[51] Int. Cl.³ .......................... B23B 17/00; F16C 5/00
[52] U.S. Cl. ...................................... 82/32; 308/3 A; 409/214
[58] Field of Search .......................... 82/32; 409/214; 308/3 A

[56] References Cited

U.S. PATENT DOCUMENTS

| | | | |
|---|---|---|---|
| 1,673,163 | 6/1928 | Schmelzkopf | 82/32 |
| 1,951,514 | 3/1934 | Lovely | 82/32 |
| 2,185,630 | 1/1940 | Fridlund | 308/3 A |
| 2,634,175 | 4/1953 | Kennedy | 308/3 A |
| 2,654,640 | 10/1953 | Bullard | 308/3 A |
| 2,929,661 | 3/1960 | Brown | 82/32 |
| 3,106,117 | 10/1963 | Duquesnel | 82/32 |

FOREIGN PATENT DOCUMENTS

| | | | |
|---|---|---|---|
| 353819 | 5/1922 | Fed. Rep. of Germany | 308/3 A |
| 2821460 | 11/1979 | Fed. Rep. of Germany | 308/3 A |

Primary Examiner—Harrison L. Hinson
Attorney, Agent, or Firm—Martin A. Farber

[57] ABSTRACT

A machine tool, particularly a lathe, milling machine or boring machine, having a machine bed on which a slide and/or tailstock is displaceably guided by means of at least one prism-shaped guideway. The guideway is formed by a guide bar which, as seen in cross-section has guide surfaces lying in pairs parallel to and opposite each other and which guide bar on a part of two adjacent of the guide surfaces is fastened in a prismatic recess in a machine bed. The slide or tailstock is displaceably supported on the guide bar via prismatic travel surfaces by means of the two other guide surfaces. A guide gib which is removably fastened to the slide or tailstock acts on the free part of the two adjacent guide surfaces serving for the attachment.

8 Claims, 4 Drawing Figures

MACHINE TOOL

This invention relates to a machine tool, particularly a lathe, milling machine or boring machine, having a machine bed on which a slide and/or tailstock is displaceably guided by means of at least one prismatic guideway.

Machine tool prismatic guideways are known in a large number of embodiments. These guideways, however, have the disadvantage that in order to obtain the required precision they can be manufactured only at a very high production cost. Such an expense is feasible, to be sure, for large expensive machine tools, however in the case of smaller machines it reaches a proportion of the total cost of manufacture which is disproportionately high.

The object of the present invention is to create an economical embodiment of a prismatic guideway for machine tools which is insensitive to vibration and obtains particularly for smaller machine tools, the required precision at considerably lesser expense and assures, either in pairs or individually together with a flatbed guide, a dependable guiding of a slide and/or tailstock of a machine tool.

The solution of this problem by the invention is characterized by the fact that the prismatic guideway is formed by a bar (3, 7, 9, 11) having, as seen in cross section, guide surfaces (3a, 3b; 7a, 7b; 9a, 9b; 11a, 11b) arranged in pairs parallel to and opposite each other, which bar is fastened on one part of two adjacent of the guide surfaces (3a, 7a, 9, 11a) in a prismatic recess (1a) in the machine bed (1) and on which guide bar the slide or tailstock is displaceably supported by means of the two other guide surfaces (3b, 7b, 9b, 11b) via prismatic travel surfaces (2a), a guide gib (6, 8, 10, 12) which is removably fastened to the slide (2) or tailstock acting on the free part of the two adjacent guide surfaces which serve for the attachment.

The prismatic guideway formed by the invention has the advantage that profiled bars having guide surfaces lying in pairs parallel to and opposite each other can be produced economically from feed stock (semi-finished product), the machining processes of this feed stock being simple to carry out, for instance by grinding. Nevertheless, such profiled bars provide a good guidance and dimensionally precise attachment to the machine bed since the prism-shaped surfaces on the one hand on the machine bed and on the other hand on the slide or tailstock can be produced in simple fashion by the same miller, so that the machining of the parts of the machine tool which cooperate with the guide bars of the invention can also be considerably simplified. As a whole there is obtained a particularly simple and nevertheless accurate guidance which is insensitive to vibrations and can be used in particular for smaller machine tools, such as used in workshops and for hobby work.

The guide bars of the invention may be of square, rectangular, hexagonal or octagonal cross section or be developed as a rhombus, since all of these cross sections have guide surfaces which are opposite and parallel to each other in pairs. Finally, in accordance with another feature of the invention, it is possible to support the guide bars over their entire length in the prismatic recess of the machine bed, since such a support is provided only on a part of two adjacent guide surfaces and the remaining part of said guide surfaces is available for the application of guide gibs which secure the slide or the tailstock against unintended lifting from the guide bar.

Figure 2:
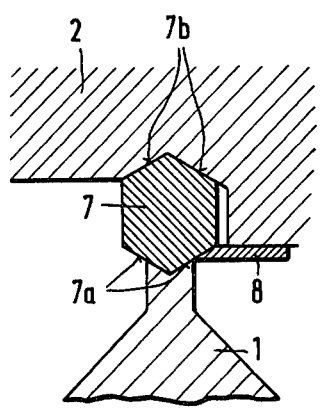
Figure 3:
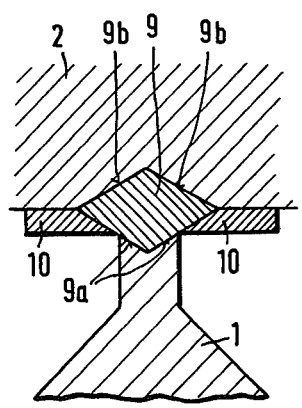
Figure 4:
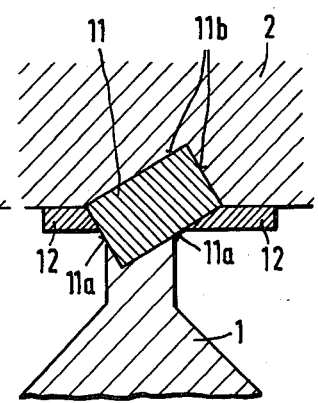

Various embodiments of the machine tool guide of the invention are shown in the drawing, in which:

FIG. 1 is a cross section through a first embodiment of a machine-tool guide with two guide bars extending parallel to each other, FIG. 2 is a cross section through a second embodiment of a guide bar, FIG. 3 is a cross section corresponding to FIG. 2 through a third embodiment, and FIG. 4 is another cross section through a fourth possible embodiment.

The embodiment of a machine tool shown diagrammatically in FIG. 1 has a machine bed 1, in the longitudinal direction of which a slide 2 and/or tailstock, not shown, is to be guided by means of prism-shaped guideways. In the embodiment shown in FIG. 1 two such prism-shaped ways are provided. However, it is also possible to provide only one prism-shaped guideway and furthermore a flatbed guideway.

Each of the two prism-shaped guideways is formed in the embodiment of FIG. 1 by a guide bar 3 of square cross section. Instead of having the solid profile shown in the drawing it can also have a hollow profile. The guide bar 3 has guide surfaces 3a and 3b which lie in pairs parallel to and opposite each other. By means of the guide surfaces 3a, each bar 3 is mounted in a prismatic recess 1a in the machine bed 1. This prismatic recess 1a can extend either over the entire length of the machine bed 1 or be formed merely by sections of the machine bed 1 which lie spaced apart, one behind the other. The attachment of the guide bars 3 is effected by attachment screws 4 which in the embodiment shown engage directly into threaded boreholes in the guide bar 3.

The slide 2 of the machine tool is provided with prismatic travel surfaces 2a by means of which it is guided on the guide surfaces 3b of the guide bars 3. The prismatic travel surfaces 2a are so developed that they rest essentially on the entire width of the guide surfaces 3b of the guide bar 3. Since the guide surfaces 3a and 3b lie in pairs parallel to and opposite each other it is possible to produce the prismatic recesses 1a in the machine bed 1 and the prismatic travel surfaces 2a in the slide 2 by the same tool, for instance a miller.

In order to secure the slide 2 against lifting off from the guide bars 3, guide gibs 6 are fastened to the bottom of the slide by means of screws 5, the guide surfaces 6a of said gibs engaging against that part of the guide surfaces 3a of each guide bar 3 which lie outside or beyond the prismatic recess 1a of the machine bed 1. In this way, these guide surfaces 3a serve not only for supporting the guide bar 3 in correct form on the machine bed 1 but also for the application of the guide gibs 6 which prevent the slide 2 from lifting off from the guide bars 3. Of course, it is also possible to provide only a single guide gib 6 rather than the guide gibs 6 arranged in pairs on both sides of the guide bar 3.

In the second embodiment, shown in FIG. 2, a guide bar 7 of hexagonal cross section is used. The two lower adjacent guide surfaces 7a of this guide bar 7 serve for mounting and support on the machine bed 1, while the opposite guide surfaces 7b are used as guide surfaces for the slide 2. In the embodiment shown in FIG. 2 only one lateral guide gib 8 is provided, it being sufficient to secure the slide 2 against lifting off from the guide bar 7.

The third embodiment, shown in FIG. 3, shows the use of a guide bar 9 of rhombic cross section. In this case also two adjacent guide surfaces 9a are used in part for mounting the guide bar 9 on the machine bed 1, while the remaining part thereof serves for the application or engagement of the guide surfaces of two guide gibs 10. The guiding of the slide 2 is again effected over approximately the entire surface of the upper guide surfaces 9b.

Finally, FIG. 4 shows the use of a guide bar 11 of rectangular, other than square, cross section, the guide surfaces 11a and 11b of which are not symmetric with respect to the vertical. In this embodiment also the guide bar 11 is mounted, however, by lower guide surfaces 11a in a corresponding recess in the machine bed 1. The recess developed for the mounting of the guide bar 11 in the machine bed 1 is present in mirror image also in the slide 2 and serves here as a guide surface for the slide 2 on the corresponding guide surfaces 11b of the guide bar 11. Lifting of the slide 2 off from the guide bar 11 is again prevented by two guide gibs 12. Despite the asymmetrical development of the recesses in the machine bed 1 and slide 2 with respect to the vertical, these recesses can be produced by means of the same tool so that the embodiment in accordance with FIG. 4 not only has a guide bar 11 which is economical to manufacture but also provides a favorable possibility of machining on the one hand for the machine bed 1 and on the other hand for the slide 2.

I claim:

1. A machine tool having a machine bed on which a member constituting a slide and/or tailstock is displaceably guide by means of two prism-shaped guideways, comprising two guideways each comprising a guide bar, respectively, each said guide bar, in cross-section being a polygon, having flat guide surfaces disposed in pairs parallel to and opposite each other, said guide surfaces including lower two adjacent first guide surfaces and upper two other guide surfaces, the machine bed defining a prismatic recess for each said guide bar, said guide bar only on a portion of each of said two adjacent first guide surfaces is fastened in said prismatic recess to said machine bed, said two adjacent first guide surfaces having a free portion thereof not engaging in said prismatic recess, the member being formed with downwardly facing prismatic travel surfaces being displaceably mounted on each side guide bar on said upper two other guide surfaces, guide gibs, constituting means for preventing lifting up of said member, being removeably fastened to said member and said guide gibs acting on said free portion of at least one of said two adjacent first guide surfaces of each said guide bars, respectively.

2. The machine tool according to claim 1, wherein said guide bar in cross-section is square.

3. The machine tool according to claim 1, wherein said guide bar in cross-section is rectangular.

4. The machine tool according to claim 1, wherein said guide bar in cross-section is hexagonal.

5. The machine tool according to claim 1, wherein said guide bar in cross-section is octagonal.

6. The machine tool according to claim 1, wherein said guide bar in cross-section is a rhombus.

7. The machine tool according to claim 1, wherein said guide bar is supported over its entire length in said prismatic recess of said machine bed.

8. The machine tool according to claim 1, wherein said guide gibs are formed with holes, screw means extend through said holes threading into said member, said holes have a lateral width greater than the diameter of said screw means.

* * * * *